UNITED STATES PATENT OFFICE.

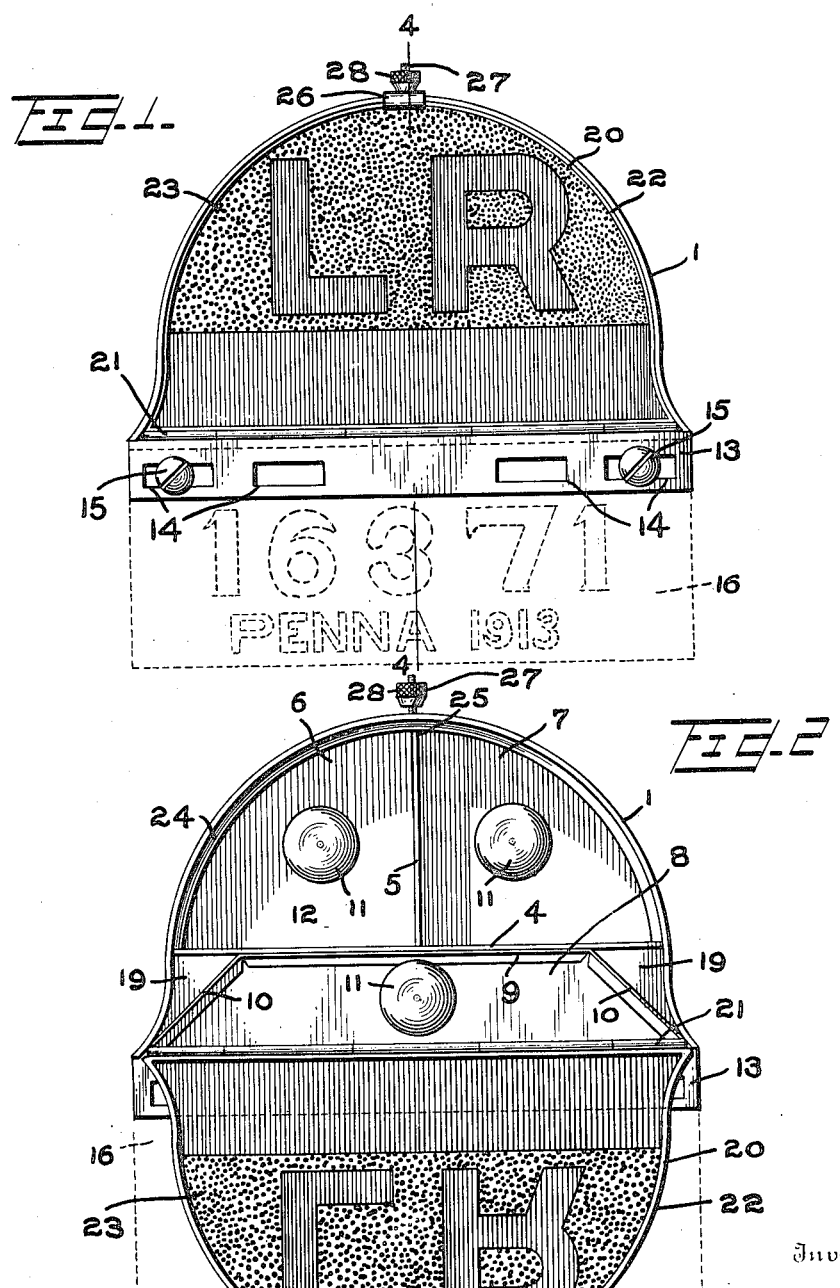

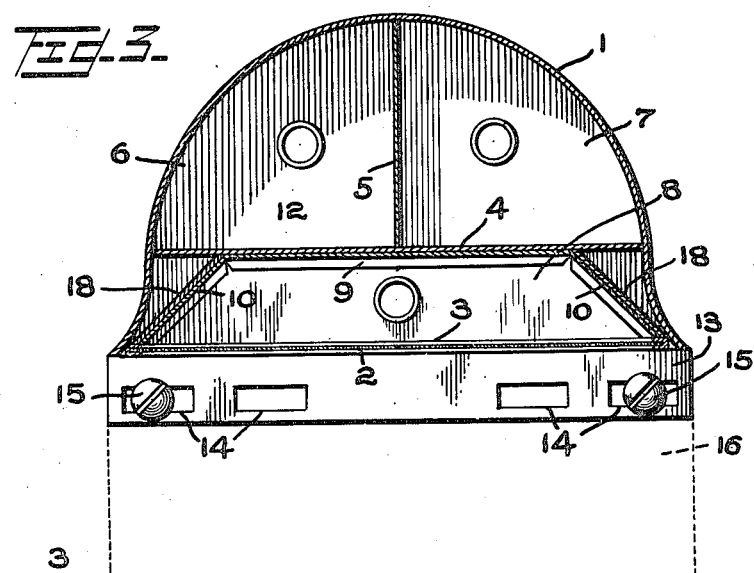
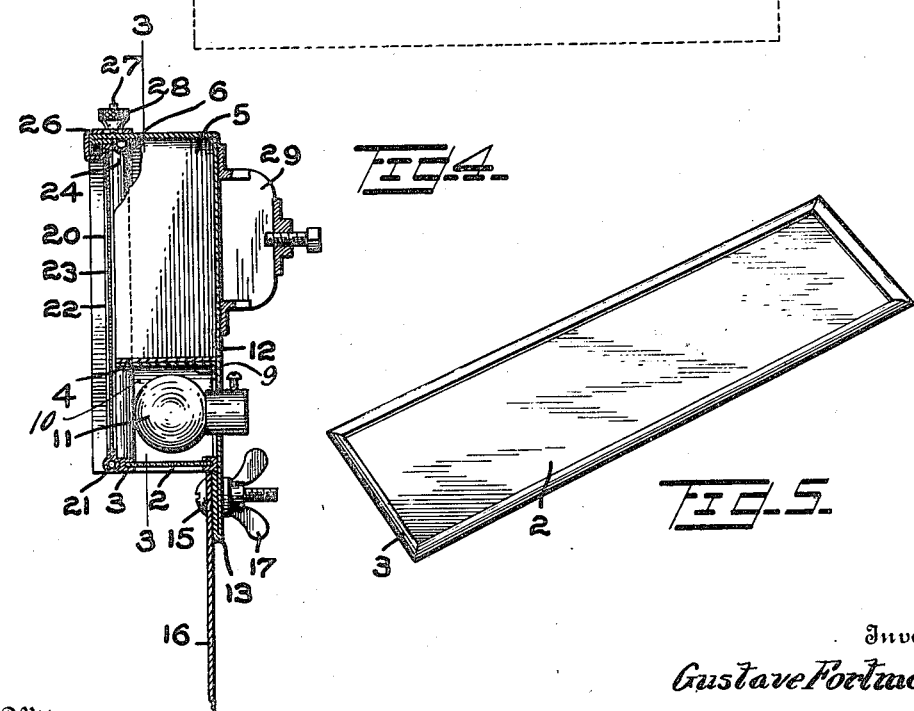

GUSTAVE FORTMANN, OF PHILADELPHIA, PENNSYLVANIA, ASSIGNOR TO AUTO SAFETY SIGNAL LAMP COMPANY, A CORPORATION OF DELAWARE.

SIGNALING DEVICE.

1,070,028.  Specification of Letters Patent.  Patented Aug. 12, 1913.

Application filed December 6, 1912. Serial No. 735,243.

*To all whom it may concern:*

Be it known that I, GUSTAVE FORTMANN, a citizen of the United States, residing at Philadelphia, in the county of Philadelphia and State of Pennsylvania, have invented certain new and useful Improvements in Signaling Devices, of which the following is a specification.

My invention relates to improvements in signaling devices, and more particularly to an improved combined signal lamp and license tag holder adapted to be supported on a vehicle, and which is adapted to signal to a car in the rear which direction the vehicle is to turn and also illuminate the license tag.

A further object is to so construct a device of this character as to prevent any light from getting behind the license tag and confining the rays of light directly upon the tag.

With these and other objects in view, the invention consists in certain novel features of construction and combinations and arrangements of parts as will be more fully hereinafter described and pointed out in the claim.

In the accompanying drawings: Figure 1 is a view in elevation illustrating my improved signaling device showing the license tag in dotted lines. Fig. 2 is a similar view showing the door open and thrown downward to disclose the interior construction. Fig. 3 is a view in longitudinal vertical section on the line 3—3 of Fig. 4. Fig. 4 is a view in section on the line 4—4 of Fig. 1 with a part of the vertical partition broken away, and Fig. 5 is a perspective view of the glass and its frame.

1 represents the casing of my improved signaling device which is of general semi-cylindrical form with the exception that the lower end is flared outward slightly, and is closed at its lower edge by means of a glass 2 secured in a metal frame 3, the latter fixed in the casing preferably by solder. The casing 1 is divided by a horizontal partition 4 and a vertical partition 5 into three chambers 6, 7, and 8, respectively. The lower chamber 8 has a mirror strip 9 secured therein, the intermediate portion of said strip lying against the lower face of partition 4, and the ends of said mirror strip positioned at an angle as shown at 10, so that the light from a lamp 11 located in chamber 8 is deflected downwardly, and the rays confined within certain limits.

The back plate 12 of casing 1 extends below the casing and forms a license tag support 13. This support 13 is provided with slots 14 for the reception of bolts 15 which are projected through openings in a license tag 16, and secured by thumb nuts 17. When the license tag is in position, the reflector strip 9 with its ends 10 serves to throw the light directly upon the tag, and as the tag is secured to the support 13 constituting a portion of the back plate, no light can get behind the tag, and hence the light will be only on the face of the tag, so that its number may be readily seen at night.

The ends 10 of the mirror strip 9 are reinforced by packing strips 18, and this construction is hid from view by covering plates 19 which also strengthen the construction.

A door 20 is connected at its lower edge by a hinge 21 with the frame 3 of glass 2. This door conforms in shape to the shape of the casing, and comprises an outer metal frame 22 confining a glass 23. This door when closed, fits snugly inside of the casing and bears against the plates 19 and against a rounded bead 24 secured to the inner face of the casing and extending through a recess 25 in partition 5. In other words, a continuous surface is provided inside the casing against which the metal frame 22 of the door bears, and at the free edge of said door, a bifurcated tongue 26 is located and engages a screw 27 on top of the casing, and is securely locked by means of a thumb nut 28 which is jammed against the same.

Each of the chambers 6, 7, and 8 is provided with an incandescent lamp 11, and these lamps are connected electrically by suitable controlling mechanism adjacent the driver or chauffeur, so that he can cause the lamps to become illuminated at will. The lamp 11 in chamber 8 is always lighted at night. The glass 23 in the door 20 is rendered partly opaque, and the rest of the glass is red, so that it shows red in front of chamber 8, and red letters "L" and "R" in front of chambers 6 and 7 respectively. Of course, this color might be changed to suit conditions, but it is preferable to have the red in front of chamber 8 which shows the customary danger signal at the back of the car.

The letters "L" and "R" indicate that the vehicle is to turn to the left or right, and the chauffeur causes the lamps to become illuminated to signal to the car in the rear his intention.

On the back of the casing, a bracket 29 is secured, and is adapted to secure the signaling device to any approved supporting bracket on a vehicle. It will therefore be noted that my improved signaling device dispenses with the necessity for any rear light in addition to its function of signaling, and furthermore the construction above set forth insures a clear illumination of the license tag.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

A signaling device of the character described, comprising a casing of semi-cylindrical form and having a flared lower end, and a flat transparent bottom secured in said flared lower end, horizontal and vertical partitions dividing said casing into three chambers, lamps in said chambers, a door closing the front of said casing and containing signaling characters in front of the two upper chambers, a license tag support on the bottom of said casing at the rear thereof, and a mirror strip secured within the lower chamber with its intermediate portion against the horizontal partition and its ends at an angle extending to the lower edge of the casing, substantially as described.

In testimony whereof I have signed my name to this specification in the presence of two subscribing witnesses.

GUSTAVE FORTMANN.

Witnesses:
R. H. KRENKEL,
CHAS. E. POTTS.